(12) United States Patent
Falk et al.

(10) Patent No.: US 8,224,852 B2
(45) Date of Patent: Jul. 17, 2012

(54) METHOD FOR PROTECTING PRODUCT DATA FROM UNAUTHORIZED ACCESS

(75) Inventors: Rainer Falk, Erding (DE); Florian Kohlmayer, Starnberg (DE); Andreas Köpf, München (DE)

(73) Assignee: Siemens Aktiengesellschaft, Munich (DE)

( * ) Notice: Subject to any disclaimer, the term of this patent is extended or adjusted under 35 U.S.C. 154(b) by 198 days.

(21) Appl. No.: 12/679,780

(22) PCT Filed: Sep. 16, 2008

(86) PCT No.: PCT/EP2008/062314
§ 371 (c)(1),
(2), (4) Date: Mar. 24, 2010

(87) PCT Pub. No.: WO2009/040273
PCT Pub. Date: Apr. 2, 2009

(65) Prior Publication Data
US 2010/0198873 A1 Aug. 5, 2010

(30) Foreign Application Priority Data
Sep. 25, 2007 (DE) .......................... 10 2007 045 776

(51) Int. Cl.
*G06F 17/30* (2006.01)
(52) U.S. Cl. ....................................................... 707/784
(58) Field of Classification Search ................... 707/784
See application file for complete search history.

(56) References Cited

U.S. PATENT DOCUMENTS

| | | | | |
|---|---|---|---|---|
| 6,311,214 B1 * | 10/2001 | Rhoads | ......................... | 709/217 |
| 6,522,770 B1 * | 2/2003 | Seder et al. | ................... | 382/100 |
| 6,650,761 B1 * | 11/2003 | Rodriguez et al. | ............ | 382/100 |
| 8,046,588 B2 * | 10/2011 | Gibart et al. | .................. | 713/186 |
| 8,107,406 B2 * | 1/2012 | Huang et al. | ............... | 370/310.2 |
| 2002/0005774 A1 | 1/2002 | Rudolph et al. | ............. | 340/5.61 |
| 2006/0174130 A1 | 8/2006 | Noble et al. | .................. | 713/182 |
| 2007/0016479 A1 | 1/2007 | Lauper | ........................... | 705/14 |

(Continued)

FOREIGN PATENT DOCUMENTS

EP 1571591 9/2005

(Continued)

OTHER PUBLICATIONS

Weis et. al. "Security and Privacy Aspects of Low-Cost Radio Frequency Systems", Lecture Notes in Computer Science, Springer Verlag, Berlin, DE (12 pages).

(Continued)

*Primary Examiner* — Sheree Brown
(74) *Attorney, Agent, or Firm* — King & Spalding L.L.P.

(57) ABSTRACT

In a method for protecting at least parts of product data, which are stored on at least one server and/or in at least one database and associated with a product identified by an RFID tag, from unauthorized access, an authentication and authorization check of an accessing party is performed upon access to a server and/or database, additionally proof being required upon access that the product is located within the discretionary area of the accessing party, the proof being provided by the RFID tag upon detection by an RFID reader by an access token in the form of a data structure, by which the RFID tag authorizes the accessing party to access at least parts of the product data associated with the product identified by the RFID tag, and stored on the server and/or in the database, wherein the product data can be queried and/or changed depending on the application.

24 Claims, 1 Drawing Sheet

U.S. PATENT DOCUMENTS

2007/0136585 A1 6/2007 Diorio et al. .................. 713/168
2008/0154623 A1* 6/2008 Derker et al. ..................... 705/1
2009/0291668 A1* 11/2009 Huang et al. .................. 455/410

FOREIGN PATENT DOCUMENTS

EP      1577824      9/2005
WO   2005001671   1/2005

OTHER PUBLICATIONS

International Search Report for Application Number and Written Opinion PCT/EP2008/062314 (14 pages), Mar. 2, 2009.

* cited by examiner

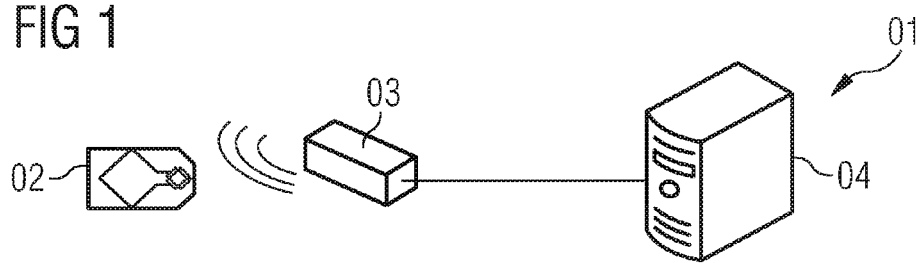
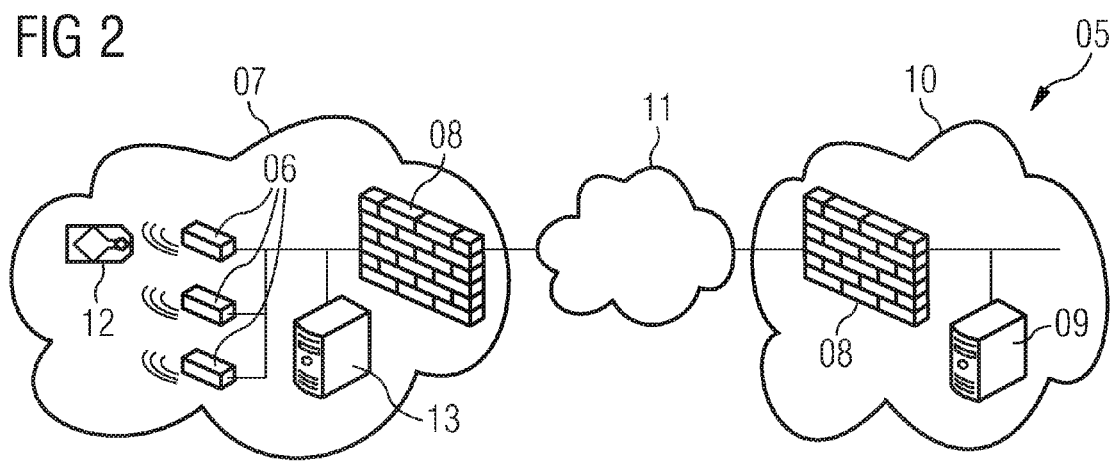
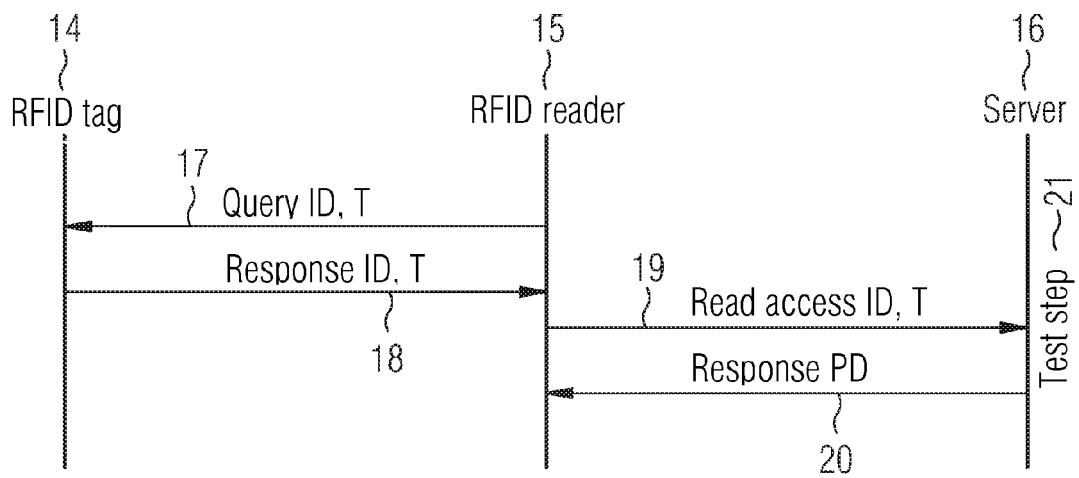

METHOD FOR PROTECTING PRODUCT DATA FROM UNAUTHORIZED ACCESS

CROSS-REFERENCE TO RELATED APPLICATIONS

This application is a U.S. National Stage Application of International Application No. PCT/EP2008/062314 filed Sep. 16, 2008, which designates the United States of America, and claims priority to German Application No. 10 2007 045 776.8 filed Sep. 25, 2007, the contents of which are hereby incorporated by reference in their entirety.

TECHNICAL FIELD

This invention related to a method for protecting product data from unauthorized access.

BACKGROUND

Radio-Frequency-Identification (RFID) tags are used to enable flows of wares to be handled more efficiently. For this purpose products are identified by an individual RFID tag. The product data itself is often stored on a server. Information stored on an RFID tag is used for identifying a product, a ware or a good, whereas further data describing the product is stored on a central computer for example.

In complex business relationships goods pass through different companies and thus also pass through different security domains, each of which must access data assigned to the goods stored on a server, both for reading and for writing or for reading or writing.

To protect data stored on a server assigned to goods identified by an RFID tag against unauthorized access, security solutions for the interface between RFID reader and RFID tag are known. This guarantees that only an authorized RFID reader can read data from an RFID tag or write data to it or that the data read comes from a non-manipulated, authenticated RFID tag. Such security solutions only conduct a check on the authorization to read data from the RFID tag itself or write it to the tag.

It is further known that on interrogation of product data of a product or good to which an RFID tag is assigned, an authentication and authorization check takes place at a server. In such cases the server checks whether the interrogation is being conducted by an authorized user. A check can for example take account of the predetermined logistics chain, i.e. the time at which the product provided with an RFID tag should be with a specific user, and then only this specific user may access the data of the typically central server with the stored product data. However such cases only involve static security mechanisms which do not take account of whether the user accessing the database or the server also actually has access to the product or the associated RFID tag.

SUMMARY

According to various embodiments, better protection against unauthorized access to goods identified by data stored on a server assigned to an RFID tag can be achieved. In particular unauthorized access to business-critical data of a competitor is to be prevented, to prevent industrial espionage for example.

According to an embodiment, in a method for protecting at least parts of product data assigned to a product identified by an RFID tag stored on at least one server and/or in at least one database from unauthorized access, an authentication and authorization check of an accessing party is undertaken during a server and/or database access, wherein during a server and/or database access an additional proof is demanded that the product is located within the discretionary area of the accessing party, which proof is provided by the RFID tag in its detection by an RFID reader by an access token in the form of a data structure, through which the RFID tag empowers the accessing party to query and/or to change at least parts of the product data, so that the product data assigned to a product can only be queried or changed by a server and/or a database when the RFID tag assigned to the product is actually also accessible.

According to a further embodiment, the access token may relate to a specific RFID tag, whereby it is valid for interrogating the product data of that product which is assigned to the RFID tag. According to a further embodiment, the access token may relate to a specific RFID reader and/or to an organizational unit of the RFID reader. According to a further embodiment, the access token may have a time limitation. According to a further embodiment, the access token may contain a number of allowed queries to make it possible for an RFID reader to carry out a specific number of read and/or write processes without reading the RFID tag again. According to a further embodiment, the access token may contain an authorization for accessing only specific components of the product data. According to a further embodiment, the access token may contain an authorization for specific actions. According to a further embodiment, the product data can be stored distributed on a number of servers and/or in a number of databases, with the access token containing an identification of the server and/or the database for which the access token is valid. According to a further embodiment, the access token may behave like a one-off password. According to a further embodiment, only one access token may be accepted as valid in each case, which is newer than a previously used access token. According to a further embodiment, a specific number of older access tokens can be accepted as valid. According to a further embodiment, regardless of the age of an access token, each access token may be accepted only once. According to a further embodiment, the age of an access token may be defined by a counter value. According to a further embodiment, the age or the validity of an access token may be defined by a nonce and/or a pseudo-random number. According to a further embodiment, the access token may be issued automatically. According to a further embodiment, the access token may be issued on request. According to a further embodiment, the server and/or the database may determine the rights of an accessing party on the basis of a number of access tokens. According to a further embodiment, a first RFID tag may create an access token representing a second RFID tag. According to a further embodiment, identification and access token may be transmitted separately between RFID tag and RFID reader. According to a further embodiment, identification and access token can be transmitted together between RFID tag and RFID reader, with the identification being contained in the access token.

BRIEF DESCRIPTION OF THE DRAWINGS

Exemplary embodiments will be explained in greater detail below on the basis of the drawing. The figures show:

FIG. 1 a schematic diagram of a device reduced to its essential components for carrying out a method according to various embodiments, FIG. 2 a schematic diagram of a distributed network for carrying out an method according to various embodiments, and also FIG. 3 a schematic diagram of a timing curve of the RFID events arising when the method according to various embodiments is carried out between RFID tag, RFID reader and product data server or database.

DETAILED DESCRIPTION

Accordingly, in a method for protecting at least parts of product data stored on at least one server and/or stored in at least one database assigned to a product identified by an RFID tag against unauthorized access, an authentication and authorization check of an accessing party is undertaken during a server or database access, a proof is additionally demanded during a server or database access that the product is located within the discretionary area of the accessing party, which proof is provided by the RFID tag during its detection by an RFID reader by an access token in the form of a data structure through which the RFID tag empowers the accessing party to interrogate at least parts of the product data assigned to the RFID tag stored on the server and/or in the database, i.e. to query the product data and/or to change it, depending on the application.

One of the advantages which emerges from the various embodiments compared to the prior art is that the product data assigned to a product from a server and/or one database can only be queried or changed if the RFID tag assigned to the product is actually accessible, i.e. if the product is actually within the discretionary area of an accessing party. It is thus not possible for the accessing party to interrogate product data of products which is their discretionary area. This means that no data can be interrogated which for example allows information to be deduced about the economic activity of competitors, such as for example which competitors have ordered or purchased which products and how many products of a particular type. Such information can at least be estimated roughly using the EPC in the prior art.

Furthermore the various embodiments reduce the possibilities for manipulation in logistics chains for example. If the actual location of a product is stored on a server or in a database, typically "picked from the warehouse", "loaded onto the truck", "delivered to the wholesaler", according to the various embodiments this information can only be updated or changed with the proof for example that the RFID tag and thereby the product is actually located in a specified area, which in this case forms the discretionary area of the accessing party.

An embodiment makes provision for the access token to relate to a specific RFID tag, whereby it applies to interrogation of the product data of that product to which the RFID tag is assigned. In the simplest case this is a static password. The resulting safety level is comparable with the knowledge of the product ID or example the electronic product code (EPC) with the proviso that this is not issued continuously but at random.

An additional embodiment provides for the access token to relate to a specific RFID reader and/or to an organizational unit of the RFID reader. In such cases a group of readers is also conceivable. To this end the RFID reader transmits an interrogation identification during the interrogation which identifies the RFID reader or the organizational unit or a group of RFID readers respectively. This is built into the access token by the RFID tag. The opportunity to use the token and thereby a potential opportunity for misuse is further restricted in this manner. On access to product data stored in a database on a server for example there is also an authentication of the accessing party, typically an RFID reader or a server of the organizational unit, and a check is made as to whether the identity of the accessing party checked by the authentication matches the query identification contained in the access token.

Another embodiment provides for the access token to have a time limitation. In the simplest case a counter value, which is incremented for each access token issued, is used here. The database then stores the next respective counter value and only allows access tokens with a higher counter value than the value stored. This results in all previously issued access tokens becoming invalid.

A further embodiment makes provision for the access token to contain a number of allowed queries, in order to make it possible for an RFID reader, without reading the RFID tag once again, to execute a specific number of read/write processes. This number can typically be predetermined by the server.

A further embodiment makes provision for the access token to include an authorization for access to only specific components of the product data or to only specific elements of the data record comprising the product data, such as only the name and the date of manufacture of the product, but not the last point at which the RFID tag was read.

It is likewise conceivable for the access token to contain an authorization for specific actions such as for read/write permissions for data on a server or in the database.

Should there be a number of different servers which store the product data in one or more distributed databases, the access token can also contain an identification of the server for which the access token is valid. The access authorization is restricted or delimited in this case in respect of the server. In this case it is basically conceivable for components of the product data with different security classifications to be stored on different servers.

A further embodiment makes provision for the access token to behave like a one-off password. In this case the access token is typically constructed in the form

<ID, CTR, CKS> with ID standing for an RFID tag identification, CTR for a counter and CKS for a checksum. The checksum CKS is a cryptographic checksum also called the Message Identification Code which is calculated with a cryptographic key known to the database and to the RFID tag. The access token increments the counter CTR each time an access token is issued. In such cases the following applies:

CKS:=F(key, <ID, CTR>)

With F being a so-called keyed one-way function. The access token consists of the data <ID, CTR, CKS>. The server or the database checks the access token for correctness with the aid of its key assigned to the ID. If the CKS value of the RFID token matches the value that it has calculated itself and if the CTR is greater than one already assigned to the ID, the access is accepted.

In such a case it is conceivable that only one access token and will be accepted as valid in each case which is newer than a previously used access token. As an alternative or in addition to this it is conceivable for a specific number of older access tokens and thereby of access tokens with lower counters to be accepted as valid. A further option is that, independent of the age of an access token and thereby independent of any last counter value, each access token and thereby each counter value is only accepted once.

The age of an access token can be defined by a counter value.

The age or the validity of an access token, instead of being defined by a counter value, can also be defined by a nonce and/or a pseudo-random number. As an alternative to the solution with the counter, the server can send a nonce in the form of the pseudo-random number example to the RFID reader, which transmits this to the RFID tag. The access token then consists of a tuple <ID, N, CKS> with CKS being defined here for CKS:=F(key, <ID, N>), i.e. as the checksum from the ID and the nonce N.

A further embodiment makes provision for the access token to be issued automatically.

Another embodiment makes provision for the access token to be issued on request, for example only when this server and/or the database demands proof of the product being located within the discretionary area of the accessing party.

The server of the database can make the selection on the basis of known static rules and only demand a further authentication authorization through the RFID tag for dubious accesses.

A further embodiment makes provision for the server or the database to determine the rights of a specific user or accessing party on the basis of a number of access tokens, for example either from one RFID tag or from a number of different tags.

A further embodiment makes provision for a first RFID tag to create an access token representative for a second RFID tag. In this case it is conceivable for the access token created by the first RFID tag also to be valid for a server and/or database access to product data assigned to a product identified by the second RFID tag. It is of advantage that only a first RFID tag within a group or a network of a number of RFID tags must be able to issue an access token. The remaining second RFID tags within the group or the network can be simple RFID tags which merely notify their identity, for example their EPC.

A further embodiment makes provision for identification and access token to be transmitted separately between RFID tag and RFID reader.

An additional embodiment makes provision for identification and access token to be transmitted together between the RFID tag and RFID reader, with the identification being contained in the access token and therefore not having to be transmitted separately.

In the last two cases specified the identification involves a number, such as an EPC for example, through which a product provided with an RFID tag and also the product data assigned to the product will be identified.

A device 01 shown in FIG. 1 consists of an RFID tag 02, an RFID reader 03 and also a product data server 04 on which product data is typically stored in a product data database. The RFID tag typically attached to product packaging in a label for example is essentially a transponder comprising an antenna, an analog circuit for receiving and transmitting as well as a digital circuit and a permanent memory. RFID tags 02 can have a random access memory in which information can be stored during their lifetime. At least the digital circuit and the memory are preferably embodied in the form of a microchip.

The RFID reader 03 creates a high-frequency electromagnetic alternating field with a short range, preferably with induction coils, which illuminates the antenna of the RFID tag. This not only transmits data but also supplies the RFID tag 02 with energy. An induction current arises in the antenna coil as soon as it comes into the electromagnetic alternating field. This induction current is rectified and thereby a capacitor is charged up as a short-term energy store, which takes care of the power supply of the microchip for the read process. If longer ranges are to be obtained and if the costs of the RFID tag 02 play a more subordinate role, active RFID tags with their own power supply can also be used. With active RFID tags a built-in battery takes over the power supply. With semi-active RFID tags the battery merely takes over the power supply to the microchip.

The microchip in the RFID tag 02 activated in this way receives commands from the RFID reader 03 which the latter modulates in its electromagnetic alternating field. The microchip generates a response and typically modulates this by field attenuation in contact-free short-circuit or by reflection of the alternating field sent out by the RFID reader 03. The RFID tag 02 thus sends its own, preferably unchangeable serial number, further numbers such as the EPC of the product provided with the RFID tag 02 and thereby identified by it, and also other data interrogated by the RFID reader 03, especially an access token.

The RFID reader 03 preferably contains software in the form of a microprogram which controls the actual read process and an RFID middleware with interfaces to further EDP systems and databases, especially to the product data database on the product data server 04.

In the device 01 processing of the RFID events, i.e. querying or changing of data stored on an RFID tag, querying of an access token and also interrogation of a database query or change is undertaken directly by the RFID reader. It is important to point out that the read and processing functionalities can also be realized on separate components.

A distributed network 05 shown in FIG. 2 for querying and changing product data consists of three RFID readers 06 for querying RFID tags 12 in a partner network 07. What is referred to as RFID event processing is also undertaken in the partner network 07. RFID event processing is managed by a separate server 13 in the partner network 07. Separated by firewalls 08, a product data server 09 on which product data is stored in a product data database and which is located in a manufacturer network 10, is remotely queried via a connecting network 11, for example over the Internet 11. A Virtual Private Network (VPN) can be established between the firewalls 08 for example in order to protect data during its transmission over the connection network 11.

An method according to various embodiments runs in the device shown in FIG. 1 and also in the distributed network shown in FIG. 2 as follows:

The product data of one or more products is stored in a product data database on a product data server. A product is identified by a product identification, abbreviated to product ID, for example by an EPC which allows the data record assigned to a product to be identified. The product ID is provided by an RFID tag. Thus product data of the database assigned to a product can be accessed, depending on the application, to either read it or write it or to both read it and write it. In this case an authentication and authorization check of the accessing party is carried out during access to the database.

According to various embodiments, a proof is now demanded additionally during database access that the product is located in the discretionary area of the accessing party. To this end the RFID tag provides the RFID reader with an access token. The access token is a data structure through which the RFID tag empowers the recipient or accessing party, typically the RFID reader, to interrogate the product data assigned to the RFID tag stored on a server, which means, depending on the circumstances, to either query or to modify the product data. This access token is presented to the database or the server with the query to gain access to the data record assigned to the product.

The access token can be embodied with different levels of complexity.

It always relates to a specific RFID tag, i.e. is only valid for querying the product data of that product which is assigned to the RFID tag. In the simplest case this is a static password. The resulting security level is comparable with the knowledge of the product ID, for example the EPC, with the proviso that this is not issued continuously but at random.

It also relates to a specific RFID reader or to the organizational unit of the RFID reader. In such cases a group of readers is also conceivable. For this purpose the RFID reader transfers a query identification for the query which identifies the RFID reader or its organizational unit or a group of RFID readers. This is built into the access token by the RFID tag. The opportunity to use the token and thereby a potential opportunity for misuse is further restricted in this manner. On access to the product data stored in a database on a server for example the accessing party is also authenticated, for example an RFID reader or a server of the organizational unit and a check is made as to whether the identity of the accessing party checked by the authentication matches the query identification contained in the access token, for example identity.

A time restriction is imposed: In the simplest case, a counter value which is increment for each access token issued, is used. The database stores the next counter value in each case and only allows access tokens with a higher counter value than that stored. This means that all previously issued access tokens are invalid.

The access token can also contain the number of allowed queries, in order to make it possible for the RFID reader, without reading the RFID tag once again, to execute a specific number of read/write processes. This number can also be predetermined by the server.

The access token can also be given an authorization for accessing only specific components of the product data or only specific elements of the data record comprising the product data, such as only the name and date of manufacture of the product, but not the last time that the RFID tag was read.

The access token can also contain an authorization for specific actions, such as for read/write permissions for data on the server.

Should there be a number of different servers which store the product data in one or more distributed databases, the access token can also contain an identification (ID) of the server for which the access token is valid. A restriction or delimitation of the access authorization is undertaken in this case in respect of the server. In such cases it is basically conceivable for components of the product data to be stored with different security classifications on different servers.

This can for example be achieved as follows: An access token is structured as follows:
<ID, CTR, CKS>
with ID standing for an RFID tag identifier, CTR for a counter and CKS for a checksum. The checksum CKS is also cryptographic checksum referred to as the Message Authentication Code which is calculated with a cryptographic key known to the database and the RFID tag. The access token increments the counter CTR each time an access token is issued.

In this case the following applies:
CKS:=F(key, <ID, CTR>)
with F being what is referred to as a keyed one-way function.

The access token consists of the data <ID, CTR, CKS>. This access token behaves like a one-off password. The server or the database checks the access token for correctness with the aid of its key assigned to the ID. If the CKS value of the RFID token matches the value that it has calculated itself and if the CTR is greater than a value already assigned to the ID, the access is accepted. Further options for checking the validity of the CTR are as follows:

Sliding Window: A specific number of older, and thus lower counters is also accepted as valid.

Independently of the last counter value, each counter value is accepted only once.

As an alternative to the solution with the counter, the server can send a nonce N, typically in the form of a pseudo-random number, to the RFID reader which transmits this number to the RFID tag. The access token then consists of a tuple <ID, N, CKS>, with CKS being determined here for CKS:=F(key, <ID, N>), i.e. as a checksum from the ID and the nonce N.

The access token can be issued automatically or on request, for example only when the server and/or the database demands proof that the products is located within the discretionary area of the accessing party. The server or the database can make the choice on the basis of known static rules and only demand a further authentication or authorization by the RFID tag for dubious accesses. Furthermore there is also the option for the server or the database to determine the rights of a specific user or accessing party on the basis of the number of access tokens, for example either from one RFID tag or from a number of different tags.

A further opportunity consists of a first RFID tag creating an access token representing a second RFID tag. In this case it is conceivable that the access token created by the first RFID tag is also valid for a server and/or database access to product data assigned to a product identified by the second RFID tag. Of advantage in this case is that only one RFID tag within the group or a network of a number of RFID tags must be able to issue an access token. The remaining a second RFID tags within the group or of the network can be simple RFID tags which only communicate their identity, for example their EPC.

The time sequence of the RFID events in an RFID query is shown in FIG. 3. If an RFID tag 14 comes within range of an RFID reader 15, the RFID reader presents a query 17 in a first RFID event 17 to the RFID tag 14. The query 17 contains an interrogation or request for an identification ID, for example the EPC, and an interrogation or request for an access token T. If the RFID tag 14 has received the query 17 it responds with a second RFID event 18 in the form of a response 18 to the query 17. The response contains the queried identification ID and an access token T. After the RFID reader 15 has received the access token T, the RFID reader is now empowered to call up product data PD assigned to a product identified by the transferred identification ID at a product data server 16. To do this the RFID reader 15 executes the third RFID event 19 in the form of a read access 19. In this read access 19 the RFID reader transfers the identification IDE and the access token T to the server 16. The server 16 checks the authentication of the accessing party, in this case the RFID reader 15. The server 16 subsequently carries out a check of the access token T in a test step 21. The server 16 detects on the basis of the access token T that the product or the RFID tag 14 is located in the discretionary area of the RFID reader 15. For a valid access token T the server 16 then transfers the requested product data PD or parts thereof in a fourth RFID event 20 in a response 20 to the RFID reader 15. Identification ID and access token T will be transmitted separately in such cases between RFID tag 14 and RFID reader 15. It is important to point out that identification ID and access token T can also be transmitted together between RFID tag 14 and RFID reader 15, with the identification ID then being contained in the access token T and therefore not having to be transmitted separately.

What is claimed is:

1. A method for protecting at least parts of product data assigned to a product identified by an RFID tag from unauthorized access, the method comprising:
- an RFID access system querying the RFID tag for an identification ID and an access token, the access token empowering the RFID access system to access product data associated with the product identified by the RFID tag;
- the RFID access system receiving a response from the RFID tag including the requested identification ID and access token;
- in response to receiving the identification ID and access token from the RFID tag, the RFID access system communicating the identification ID and access token to a server storing the product data associated with the product identified by the RFID tag;
- the server authenticating the RFID access system by determining, based on the access token received from the RFID access system, whether the product identified by the RFID tag is located in a discretionary area of the RFID access system; and
- the server providing the RFID access system access to the product data associated with the product only if server determines based on the access token that the product is located in the discretionary area of the RFID access system, wherein the server otherwise prevents access to the product data associated with the product.

2. The method according to claim 1, wherein the access token relates to a specific RFID tag, wherein the access token is valid for interrogating the product data of that product which is assigned to the RFID tag.

3. The method according to claim 1, wherein:
- the RFID access system includes an RFID reader, and
- the access token relates to at least one of the RFID reader and an organizational unit of the RFID reader.

4. The method according to claim 1, wherein the access token has a time limitation.

5. The method according to claim 1, wherein the access token contains a number of allowed queries to make it possible for the RFID access system to carry out a specific number of at least one of read and write processes without reading the RFID tag again.

6. The method according to claim 1, wherein the access token contains an authorization for accessing only specific components of the product data.

7. The method according to claim 1, wherein the access token contains an authorization for specific actions.

8. The method according to claim 1, wherein the product data is stored distributed on at least one of a number of servers and in a number of databases, with the access token containing an identification of at least one of: the server and the database for which the access token is valid.

9. The method according to claim 1, wherein the access token behaves like a one-off password.

10. The method according to claim 9, wherein only one access token is accepted as valid in each case, which is newer than a previously used access token.

11. The method according to claim 9, wherein a specific number of older access tokens are accepted as valid.

12. The method according to claim 9, wherein regardless of the age of an access token, each access token is accepted only once.

13. The method according to claim 10, wherein the age of an access token is defined by a counter value.

14. The method according to claim 10, wherein the age or the validity of an access token is defined by at least one of a nonce and a pseudo-random number.

15. The method according to claim 1, wherein the access token is issued automatically.

16. The method according to claim 1, wherein the access token is issued on request.

17. The method according to claim 1, wherein the rights of an accessing party are determined on the basis of a number of access tokens.

18. The method according to claim 1, wherein a first RFID tag creates an access token representing a second RFID tag.

19. The method according to claim 1, wherein identification and access token are transmitted separately between the RFID tag and the RFID access system.

20. The method according to claim 1, wherein identification and access token are transmitted together between the RFID tag and the RFID access system, with the identification being contained in the access token.

21. The method according to claim 1, wherein the RFID access system comprises an RFID reader.

22. The method according to claim 1, wherein the RFID access system includes an RFID reader and one or more computers communicatively coupled to the RFID reader.

23. The method according to claim 22, wherein:
- the RFID reader queries the RFID tag for the identification ID and access token, the access token empowering the one or more computers of the RFID access system to access product data associated with the product identified by the RFID tag; and
- the RFID reader receives the response from the RFID tag including the requested identification ID and access token.

24. The method according to claim 22, wherein in response to the RFID reader receiving the identification ID and access token from the RFID tag, the one or more computers of the RFID access system communicates the identification ID and access token to the server storing the product data associated with the product identified by the RFID tag.

* * * * *